(12) United States Patent
Kim et al.

(10) Patent No.: US 8,971,805 B2
(45) Date of Patent: Mar. 3, 2015

(54) PORTABLE TERMINAL PROVIDING ENVIRONMENT ADAPTED TO PRESENT SITUATION AND METHOD FOR OPERATING THE SAME

(75) Inventors: Kyung Hwa Kim, Seoul (KR); Tae Won Um, Seoul (KR); Dong Jun Shin, Seoul (KR); Kyoung Taek Kim, Gyeonggi-do (KR); Hyang Ah Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 259 days.

(21) Appl. No.: 12/844,001

(22) Filed: Jul. 27, 2010

(65) Prior Publication Data
US 2011/0034129 A1 Feb. 10, 2011

(30) Foreign Application Priority Data
Aug. 7, 2009 (KR) .......................... 10-2009-0072649

(51) Int. Cl.
*H04B 7/00* (2006.01)
*H04M 3/493* (2006.01)
*H04W 24/00* (2009.01)
*G06F 3/00* (2006.01)
(Continued)

(52) U.S. Cl.
CPC ......... *H04M 1/72572* (2013.01); *G06F 1/1626* (2013.01); *G06F 9/4443* (2013.01); *H04M 1/72569* (2013.01); *H04W 4/02* (2013.01); *H04M 1/7253* (2013.01); *H04M 2250/12* (2013.01)
USPC ................. 455/41.2; 455/414.2; 455/456.1; 455/457; 715/744; 715/745

(58) Field of Classification Search
CPC ... H04W 4/02; H04W 4/021; H04M 1/72569; H04M 1/72583
USPC ................. 455/41.2; 715/700, 744, 745, 864
See application file for complete search history.

(56) References Cited

U.S. PATENT DOCUMENTS 5,414,809 A * 5/1995 Hogan et al. ................... 715/765
5,465,358 A * 11/1995 Blades et al. ................. 715/707
(Continued)

FOREIGN PATENT DOCUMENTS

CN 101098530 A 1/2008
CN 101420487 A 4/2009
(Continued)

OTHER PUBLICATIONS

Hightower et al., "Location Sensing Techniques"; Internet Citation; Aug. 8, 2001; pp. 1-10; Seattle, Washington.

*Primary Examiner* — Wesley Kim
*Assistant Examiner* — Devan Sandiford
(74) *Attorney, Agent, or Firm* — Cha & Reiter, LLC (57) ABSTRACT

Provided is a portable terminal providing environment adapted to a current situation and a method for operating the same. The method includes the steps of: collecting current situation information of the portable terminal; searching preset situation information classified as a same situation as the current situation information; extracting function information of the portable terminal corresponding to the searched preset situation information; and constituting a Graphic User Interface (GUI) according to the extracted function information.

14 Claims, 7 Drawing Sheets

(51) Int. Cl.
*H04M 1/725* (2006.01)
*G06F 1/16* (2006.01)
*G06F 9/44* (2006.01)
*H04W 4/02* (2009.01)

(56) References Cited

U.S. PATENT DOCUMENTS

| | | | |
|---|---|---|---|
| 5,724,985 A * | 3/1998 | Snell et al. | 600/510 |
| 6,567,104 B1 * | 5/2003 | Andrew et al. | 715/762 |
| 6,661,438 B1 | 12/2003 | Shiraishi et al. | |
| 6,874,127 B2 | 3/2005 | Newell et al. | |
| 6,912,386 B1 * | 6/2005 | Himberg et al. | 455/423 |
| 7,185,290 B2 | 2/2007 | Cadiz et al. | |
| 7,725,832 B2 | 5/2010 | Cadiz et al. | |
| 8,005,729 B1 * | 8/2011 | Ulm et al. | 705/30 |
| 8,026,805 B1 | 9/2011 | Rowe | |
| 8,135,777 B2 * | 3/2012 | Colligan et al. | 709/203 |
| 2002/0133545 A1 * | 9/2002 | Fano et al. | 709/203 |
| 2002/0160817 A1 | 10/2002 | Salmimaa et al. | |
| 2003/0020816 A1 * | 1/2003 | Hunter et al. | 348/231.3 |
| 2003/0046401 A1 | 3/2003 | Abbott et al. | |
| 2004/0204063 A1 * | 10/2004 | Van Erlach | 455/556.1 |
| 2005/0044508 A1 * | 2/2005 | Stockton | 715/811 |
| 2005/0054381 A1 * | 3/2005 | Lee et al. | 455/557 |
| 2005/0204310 A1 * | 9/2005 | De Zwart et al. | 715/821 |
| 2006/0048064 A1 | 3/2006 | Vronay | |
| 2006/0094447 A1 * | 5/2006 | Zellner | 455/456.3 |
| 2006/0107219 A1 | 5/2006 | Ahya et al. | |
| 2006/0156209 A1 | 7/2006 | Matsuura et al. | |
| 2007/0022380 A1 | 1/2007 | Swartz et al. | |
| 2007/0061735 A1 | 3/2007 | Hoffberg et al. | |
| 2007/0298843 A1 | 12/2007 | Kwon | |
| 2008/0036591 A1 * | 2/2008 | Ray | 340/540 |
| 2008/0155476 A1 * | 6/2008 | Forbes et al. | 715/835 |
| 2008/0162037 A1 * | 7/2008 | Hasan Mahmoud | 701/208 |
| 2008/0182591 A1 | 7/2008 | Krikorian | |
| 2008/0318616 A1 * | 12/2008 | Chipalkatti et al. | 455/550.1 |
| 2009/0049389 A1 * | 2/2009 | Kuzmanovic | 715/745 |
| 2009/0083663 A1 | 3/2009 | Kim | |
| 2009/0156124 A1 | 6/2009 | Liu et al. | |
| 2009/0280817 A1 | 11/2009 | Chavez et al. | |
| 2010/0031198 A1 | 2/2010 | Zimmerman et al. | |
| 2010/0041422 A1 * | 2/2010 | Wormald et al. | 455/466 |
| 2010/0083169 A1 | 4/2010 | Athsani et al. | |
| 2010/0188279 A1 * | 7/2010 | Shamilian et al. | 341/176 |
| 2010/0235203 A1 | 9/2010 | Baskin et al. | |
| 2010/0285786 A1 | 11/2010 | Yamada et al. | |
| 2011/0035675 A1 * | 2/2011 | Kim et al. | 715/745 |

FOREIGN PATENT DOCUMENTS

| | | | | |
|---|---|---|---|---|
| EP | 1631050 A1 * | 3/2006 | | H04M 1/247 |
| JP | 2009-33256 A | 2/2009 | | |
| KR | 2006-0019320 | 3/2006 | | H04Q 7/38 |
| KR | 10-2007-0013442 A | 1/2007 | | |
| KR | 10-0685286 | 2/2007 | | H04B 1/40 |
| KR | 2007-0014596 | 2/2007 | | H04B 1/40 |
| KR | 10-0905622 | 6/2009 | | H04B 1/40 |
| WO | 01/50151 A1 | 7/2001 | | |
| WO | 02/089342 A1 | 11/2002 | | |
| WO | 2004/077291 A1 | 9/2004 | | |
| WO | 2009/063441 A2 | 5/2009 | | |

* cited by examiner

PORTABLE TERMINAL PROVIDING ENVIRONMENT ADAPTED TO PRESENT SITUATION AND METHOD FOR OPERATING THE SAME

CLAIM OF PRIORITY

This application claims priority to and the benefit of the earlier filing date of that patent application entitled "Portable Terminal for PTT and Method for Executing Missed PTT Call Information of Thereof, filed in the Korean Patent Office on Aug. 7, 2009 and afforded serial number 10-2009-0072649, the contents of which are incorporated by reference herein.

BACKGROUND OF THE INVENTION

1. Field of the Invention

The present invention relates to the field of portable terminals and more particularly providing an environment adapted to a present situation in the portable terminal.

2. Description of the Related Art

With the rapid increase in the spread of portable terminals, portable terminal have become a necessity in today's personnel and business environment. Such portable terminal may provide many different kinds of data transmission services and various additional services as well as unique voice call service and, thus, represent a functional multimedia communication device.

Most of today's portable terminal users carry a portable terminal and use functions included therein as desired. Upon considering usage patterns of the portable terminal by users, it is understood that there are common functions of the portable terminal that are used in specific situations. For example, when the user carries the portable terminal and moves abroad, there can be functions that users commonly use in these situations. In this case, when the portable terminal checks the user's current situation, the terminal may be adapted to provide a suitable usage environment so that the user can execute desired functions.

The present invention suggests a portable terminal providing environment adapted to a present situation, in particular, a user interface, and a method for operating the same.

SUMMARY OF THE INVENTION

The present invention has been made in view of the above problems, and provides a portable terminal providing environment adapted to present situation and a method for operating the same.

In accordance with an aspect of the present invention, a method for providing usage environment in a portable terminal includes: collecting current situation information of the portable terminal; searching preset situation information classified as a same situation as the collected current situation information; extracting function information of the portable terminal corresponding to the searched preset situation information; and constituting a Graphic User Interface (GUI) according to the extracted function information.

In accordance with another aspect of the present invention, a portable terminal providing a usage environment suitable for a current situation includes: a situation information collection module unit that collects current situation information of the portable terminal; a storage unit which stores preset situation information; and a controller that controls the situation information collection module unit and collects the current situation information of the portable terminal, searches preset situation information classified as a same situation as the collected current situation information, extracts function information of the portable terminal corresponding to the searched preset situation information, and constitutes a Graphic User Interface (GUI) according the extracted function information.

In accordance with another aspect of the invention, a portable device comprises a display unit; and a processor in communication with a memory, the memory including code, which when accessed by the processor causes the processor to: collect current situation information regarding the portable terminal; search preset situation information stored in the memory; determine which of said preset situation information correspond to the collected current situation information; extract function information corresponding to the searched preset situation information matched to the collected current situation information; and form a Graphic User Interface (GUI) utilizing the extracted function information; and display the formed GUI on the display unit.

In the present invention, a user is provided with an environment adapted to a present situation upon using a portable terminal, so that desired functions of the portable terminal can be conveniently executed.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
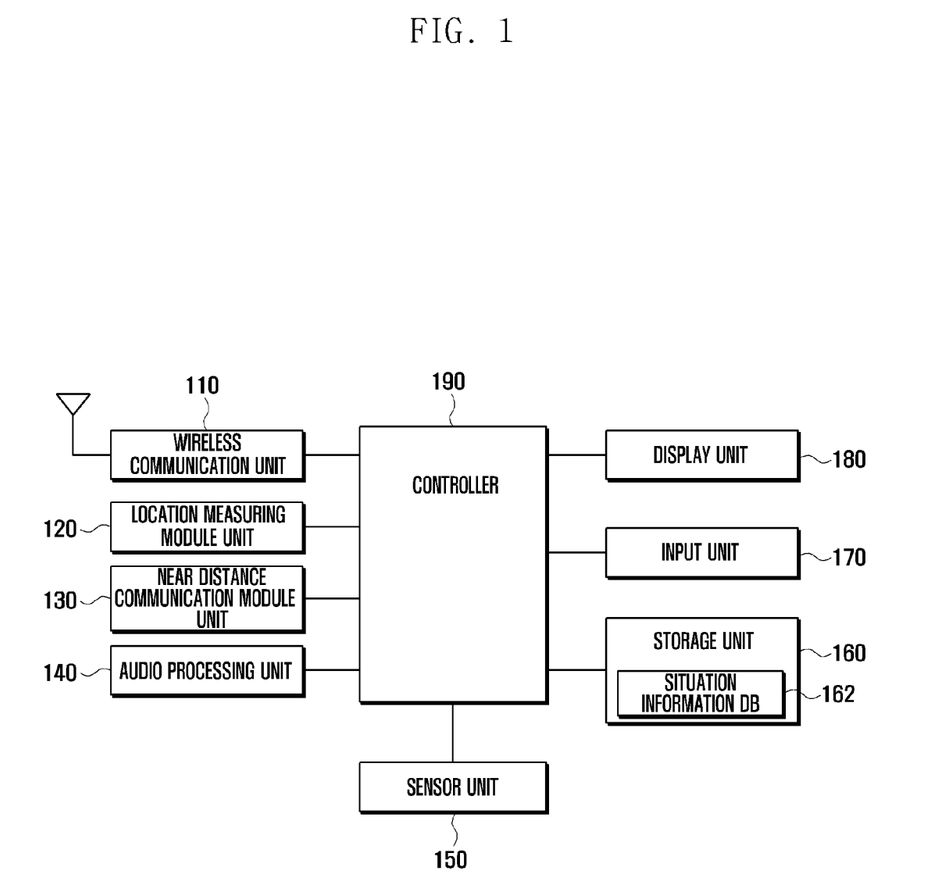
FIG. 1 is a block diagram illustrating a configuration of a portable terminal adapted to a present situation according to an exemplary embodiment of the present invention.

Exemplary embodiments of the present invention are described in detail with reference to the accompanying drawings. The same reference numbers are used throughout the drawings to refer to the same or like parts. Detailed descrip- FIG. 1 is a block diagram illustrating a portable terminal providing environment adapted to present situation according to an embodiment of the present invention.

A wireless communication unit 110 performs transmitting and receiving functions of corresponding data for wireless communication of a portable terminal. The wireless communication unit 110 can include an RF transmitter (not shown) for up-converting a frequency of a to-be transmitted signal and amplifying the to-be transmitted signal, and an RF receiver (not shown) for low-noise-amplifying a received signal and down-converting the received signal. Further, the wireless communication unit 110 may output received data to controller 190, and transmit data, output from the controller 190, through the wireless channel. The wireless communication unit 110 according to an embodiment of the present invention may receive signals from at least three base stations (BSS) (not shown) and output them to the controller 190. The controller 190 may measure location information based on a time difference of arrival among the signals received from the at least three base stations. A location measuring module unit 120 is an element measuring location information of the portable terminal. A Global Positioning System (GPS) module is a representative example of the location measuring module unit 120. However, the present invention is not limited thereto. Namely, all devices capable of measuring a location of the portable terminal can be used as the location measuring module unit 120. A near distance communication module unit 130 is a unit to enable data communication between portable terminals in a given radius. The near distance communication module unit 130 may include Bluetooth communication module, infrared communication module, Zigbee communication module, or the like. The near distance communication module unit 130 receives information of neighboring portable terminals or devices, and transmits it to the controller 190. The information of neighboring portable terminals or devices may be information constituting 'situation information' by itself, and can be used as data to collect 'location information' constituting the 'situation information'.

The audio processing unit 140 may include a CODEC (not shown). The CODEC includes a data CODEC processing packet data and an audio CODEC processing an audio signal, such as voices. The audio processing unit 140 converts a digital audio signal into an analog audio signal using an audio CODEC, and plays the analog audio signal using a speaker (SPK) (not shown). Further, the audio processing unit 130 converts an analog audio signal input from a microphone (MIC) (not shown) into a digital audio signal using the audio CODEC. The MIC of the audio processing unit 140 according to an embodiment of the present invention may collect audio signals generated in a surrounding environment and send the collected audio signals to the controller 190. The collected audio signal can be used as data to collect 'location information' constituting 'situation information'.

A sensor unit 150, for example, may represent a sensor that can collect information regarding surrounding environment. The sensor unit 150 is different than the wireless communication unit 110, the location measuring module unit 120, the near distance communication module unit 130, and the audio processing unit 140, previously described. The sensor unit 150 may include, for example, an image sensor, an acceleration sensor, a proximity sensor, an illumination sensor, a temperature sensor, a humidity sensor, a tilt sensor, a gyro sensor, or a pressure sensor. A camera module photographs images of the surrounding environment and sends it to the controller 190. Photographed image information can be used as data to collect 'location information' constituting 'situation information'. For example, when a portable terminal is located in an indoor space and a camera module included in the portable terminal photographs a ceiling of the indoor space, the photographed ceiling image may become data to determine a location of the portable terminal. The wireless communication unit 110, the location measuring module unit 120, the near distance communication module unit 130, the audio processing unit 140, and the sensor unit 150 may constitute a situation collecting module unit.

A storage unit 160 serves to store programs and data necessary for the operation of the portable terminal. The storage unit 160 may be divided into a program area (not shown) and a data area (not shown). The storage unit 160 may be composed of a volatile storage medium, a nonvolatile storage medium, or a combination thereof. The volatile storage medium may include semiconductor memories such as RAM, DRAM, or SRAM. The nonvolatile storage medium includes a hard disk and/or semiconductor memories such as PROM or FLASH. The storage unit 160 according to an embodiment of the present invention stores graphic object information matched with functions of the portable terminal. A graphic object according to an embodiment of the present invention may be constituted by a function execution icon. The storage unit 160 according to an embodiment of the present invention stores a situation information data base (DB) 162. Function information and situation information preset in the portable terminal are stored in the situation information DB 162. The situation information may contain time information, location information of the portable terminal, information regarding devices located around the portable terminal, and moving distance information. In addition, the situation information may include all information for determining situation.

An input unit 170 receives a user's key operation signal for controlling the portable terminal and sends it to the controller 190. The input unit 170 may include a key pad with numeric keys, character keys, and arrow keys, such as a 3*4 keyboard, a QWERTY keyboard, or a key pad. The input unit 170 generates an input signal for executing functions of the portable terminal according to a user's input. A display unit 180 can be formed of a Liquid Crystal Display (LCD) or similar types of display (e.g., Organic Light Emitting Diode (OLED). The display unit 180 visibly provides menus of the portable terminal, input data, function setting information, and other various information to a user. For example, the display unit 180 may execute one or more functions for outputting a booting screen, an idle screen, a display screen, a call screen, and other application execution screens. The display unit 180 according to an embodiment of the present invention displays a Graphical User Interface (GUI) that is constituted by a GUI configuration unit 196 as described below. The GUI constituted by a GUI configuration unit 196 is composed of stored function information matched with current situation information of the portable terminal. The function information is displayed with a graphic object, such as a function execution icon. The display unit 180 according to an embodiment of the present invention may display a message for selecting whether to display the GUI containing function information set in response to the current situation information. The controller 190 controls overall operation of the portable terminal and signal flow among internal functional (physical and logical) blocks therein. A detailed configuration of the controller 190 is described with reference to FIG. 2.

Figure 2:
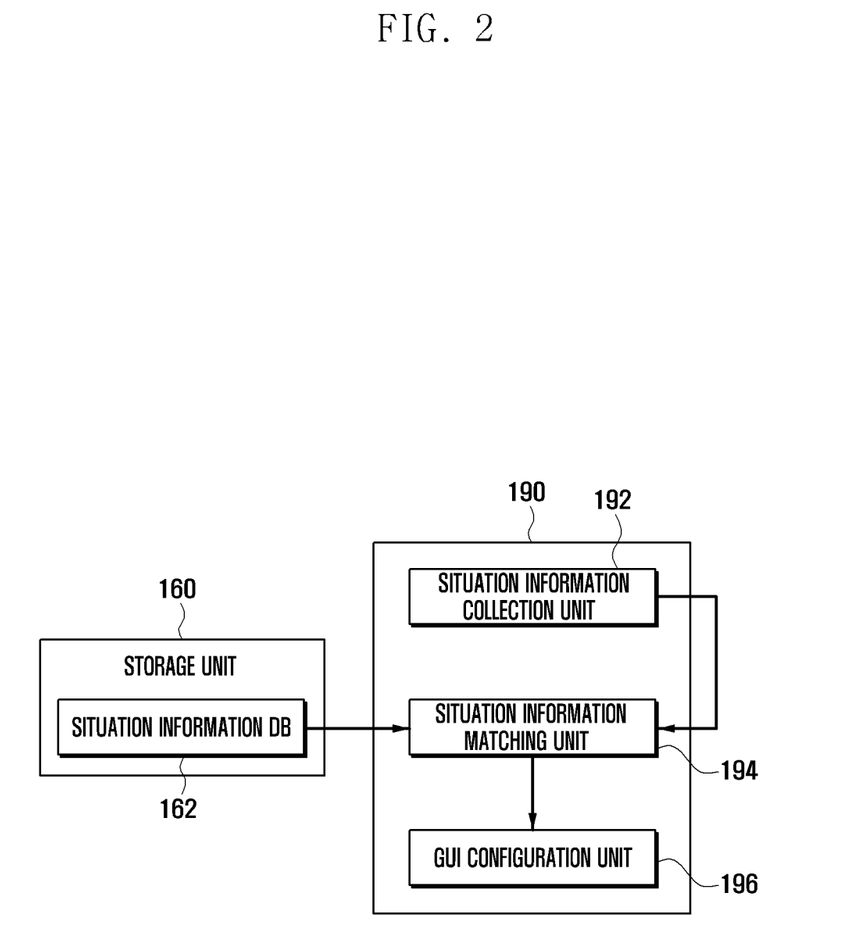
FIG. 2 is a drawing illustrating a configuration of a controller 190 in a portable terminal according to an exemplary embodiment of the present invention.

FIG. 2 illustrates a configuration of a controller 190 in a portable terminal according to an exemplary embodiment of the present invention.

The controller 190 according to an embodiment of the present invention includes a situation information collection unit 192, a situation information matching unit 194 and a GUI configuration unit 196. The situation information collection unit 192 collects situation information of a portable terminal. The situation information collection unit 192 may collect the situation information in real-time or may collect the situation information according to a set cycle. The situation information can include time information, the portable terminal's location information, information of neighboring device and moving distance information. The situation information collection unit 192 can collect the location information and the moving distance information of the portable terminal by controlling at least one element among a wireless communication unit 110, a location measuring module unit 120, a near distance communication module unit 130, an audio processing unit 140 and a sensor unit 150. The situation information collection unit 192 may also collect the information of a neighboring device(s) by controlling the near distance communication module unit 130. The situation information collection unit 192 collects the current situation information and sends it to the situation information matching unit 194. The situation information matching unit 194 receives the current situation information and searches the stored situation information to determine or classify one of the situations stored in the situation information DB 162 as the received current situation information. That is, the situation information matching unit 194 matches the current situation information to situation information stored in the situation information DB 162, and determines whether they are substantially identical. When situation information stored in the situation information DB 162 is set as a range, the situation information matching unit 194 determines whether the current situation information is included within the preset range value. The situation information matching unit 194 extracts function information corresponding to situation information identical with current situation information or situation information having an area range containing the current situation information and sends it to the GUI configuration unit 196. The GUI configuration unit 196 receives function information from the situation information matching unit 194, and forms a GUI based on graphic objects (e.g., a function execution icon) corresponding to the received function information. The GUI configuration unit 196 transmits the constituted (formed) GUI to display unit 180 (FIG. 1), and the display unit 180 displays the constituted GUI under the control of the controller 190. According to an embodiment of the present invention, the GUI configuration unit 196 forms a GUI providing means for selecting between modified normal mode and situation suitable mode.

Until now, a portable terminal providing an operating environment suitable to the current situation has been described, and, hereinafter, the operating method of the portable terminal is described. The present invention can employ a location measuring module unit 120, such as a GPS module, as a means of collecting the location information or the moving distance information of the portable terminal. In addition, the portable terminal can also employ the wireless communication unit 110, the near distance communication module unit 130, the audio processing unit 140 and the sensor unit 150 to obtain location information or determine a location. This means that the situation information collection unit 192 can collect location information using a multiple of elements according to an area range of location information to be collected. For example, when it is desired to collect location information of a comparatively wide range like 'Seocho Dong, Seocho Gu, Seoul city', the portable terminal collects the location information only using the location measuring module unit 120. In case of a portable terminal having no location measuring module unit 120, location information can be collected using a signal received from at least three stations through the wireless communication unit 110. On the other hand, it is desired to collect location information of a narrow range like 'my room at A apartment 33-101, Seocho Dong, Seocho Gu, Seoul city' that cannot be collected only by a location measuring module unit 120, the portable terminal may collect the location information using the near distance communication module unit 130, the audio processing unit 140 and/or the sensor unit 150 as well as the location measuring module unit 120.

Figure 3:
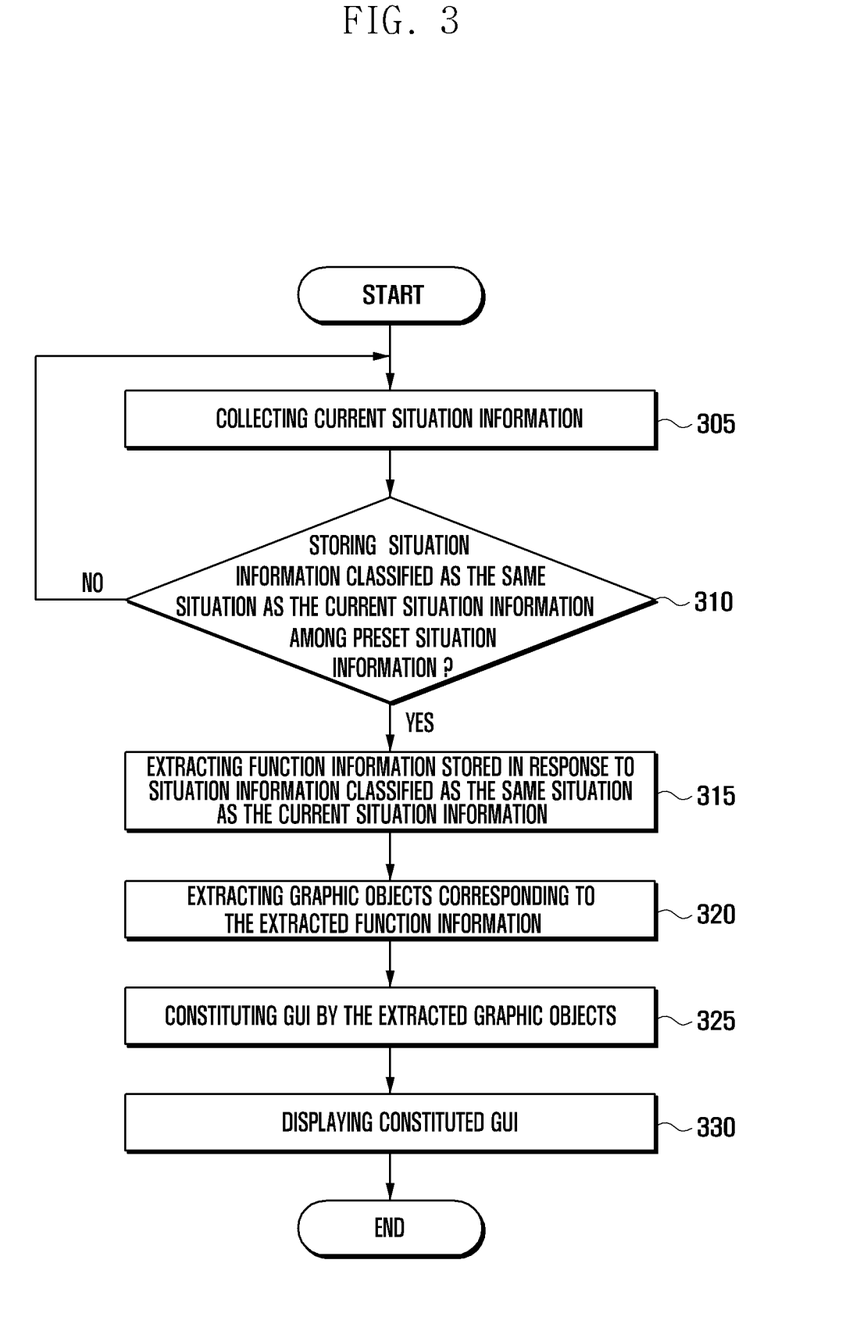
FIG. 3 is a flowchart illustrating the operation method of a portable terminal providing a usage environment suitable for the current situation according to an exemplary embodiment of the present invention.

FIG. 3 is a flowchart illustrating the operation method of a portable terminal providing a usage environment suitable for the current situation according to an exemplary embodiment of the present invention.

In description of the portable terminal's operating method as shown in FIG. 3, it is assumed that at least one preset situation information and function information are matched and stored in the situation information DB 162. The situation information and function information stored in the situation information DB 162 may be set and stored in the manufacture of a portable terminal, or may be set and stored by a user. The situation information collection unit 192 collects 'situation information' (305). The situation information collection unit 192 can collect the current 'time information' or can collect 'location information' of a portable terminal. In addition, it may collect both 'time information' and 'location information' of a portable terminal. According to an embodiment of the present invention, the situation information collection unit 192 may also collect 'peripheral device information.' The peripheral device information refers to information regarding an external portable terminal or a device placed in the surrounding area of the portable terminal. Also, the situation information collection unit 192 may collect 'moving distance information.' 'Moving distance information' refers to information regarding a moving distance of the user. The situation information collection unit 192 collects 'moving distance information' by setting a specific location information as a reference point, collecting current location information in real-time, and then, using distance information between the specific location information set as a reference point and the current location information. The situation information collection unit 192 collects current time information from a time measurement module provided in the portable terminal, or collects current time information by receiving a signal including time information from a base station. Also, the situation information collection unit 192 collects current location information, which is the location of the portable terminal, using at least one of the wireless communication unit 110, the location measuring module unit 120, the near distance communication module unit 130, the audio processing unit 140 and the sensor unit 150. According to an embodiment of the present invention, the situation information collection unit 192 may collect 'peripheral device information' on any neighboring external portable terminal or device by controlling the near distance communication module unit 130. For example, when the near distance communication module unit 130 is a Bluetooth module, the near distance communication module unit 130 can broadcast an inquiry signal in a given period and receive an inquiry response signal from a neighboring portable terminal or device and, thus, collect information that another portable terminal or device is placed in the surrounding area. The situation information matching unit 194 receives the current situation information from the situation information collection unit 192, and searches situation information classified as the same situation as the received current situation information from the situation information DB 162 (310). That is, the situation information matching unit 194 determines whether situation information identical with a current situation information or situation information having an area range containing the current situation information is stored in the situation information DB 162. In the situation information DB 162, 'situation information' and 'function information' are matched and stored. The situation information matching unit 194 extracts situation information identical to the current situation information or situation information having an area range comprising the current situation information from the situation information DB 162. If situation information is constituted with time information and location information, the situation information matching unit 194 extracts time information and location information identical with the current time information and the current location information, or extracts the time information and location information constituted with the current time information and an area range including current location information from the situation information DB 162. The 'time information' stored in the situation information DB 162 may be stored in 'minute' units like '13:21', or in 'second' units, and may be stored as a range, such as '20 minutes' units, (e.g., '13:20-13:40') or '1 hour' units (e.g., '13:00-14:00'). Also, 'location information' stored in the situation information DB 162 may be stored in a nation unit (e.g., 'England'), or in a city unit (e.g., 'London, England') or in a unit which is smaller than the city unit.

According to an embodiment of the present invention, the situation information DB 162 may store 'peripheral device information (e.g., Bluetooth device information)' and 'moving distance information' as 'situation information'. The situation information matching unit 194 extracts function information corresponding to situation information identical with the current situation information from the situation information DB 162 (315). According to an embodiment of the present invention, the situation information matching unit 194 determines situation information having a range including the current situation information and extracts corresponding function information. The GUI configuration unit 196 extracts graphic objects corresponding to the extracted function information from a storage unit 160 (320). According to an embodiment of the present invention, the storage unit 160 stores graphic objects in response to each function information, and 'graphic object' may representatively correspond to 'function execution icon'. The GUI configuration unit 196 constitutes a GUI to be displayed on the display unit 180 by using the extracted graphic objects (325). The controller 190 displays a GUI formed by the GUI configuration unit 196 by controlling the display unit 180 (330). In a preset environment, a display screen of a portable terminal may be constituted of two kinds of modes. One being a 'general mode' that is a background screen of a general portable terminal, and the other corresponds to a 'situation suitable mode' that is a screen displaying a GUI constituted by the GUI configuration unit 196.

According to an embodiment of the present invention, the controller 190 can display a message for selecting whether to display GUI suitable to a current situation by controlling the display unit 180. After the situation information matching unit 194 extracts function information corresponding to the situation information found to be identical with the current situation information from the situation information DB 162 (315), the controller 190 can display a message for selecting whether to display GUI suitable to the current situation by controlling the display unit 180. The GUI configuration unit 196 may then extract graphic objects corresponding to the function information (320), and constitute (form) a GUI (325) based on the extracted graphic objects. The controller 190 can display a message for selecting whether to display the GUI suitable to the current situation by controlling the display unit 180.

Figure 4:
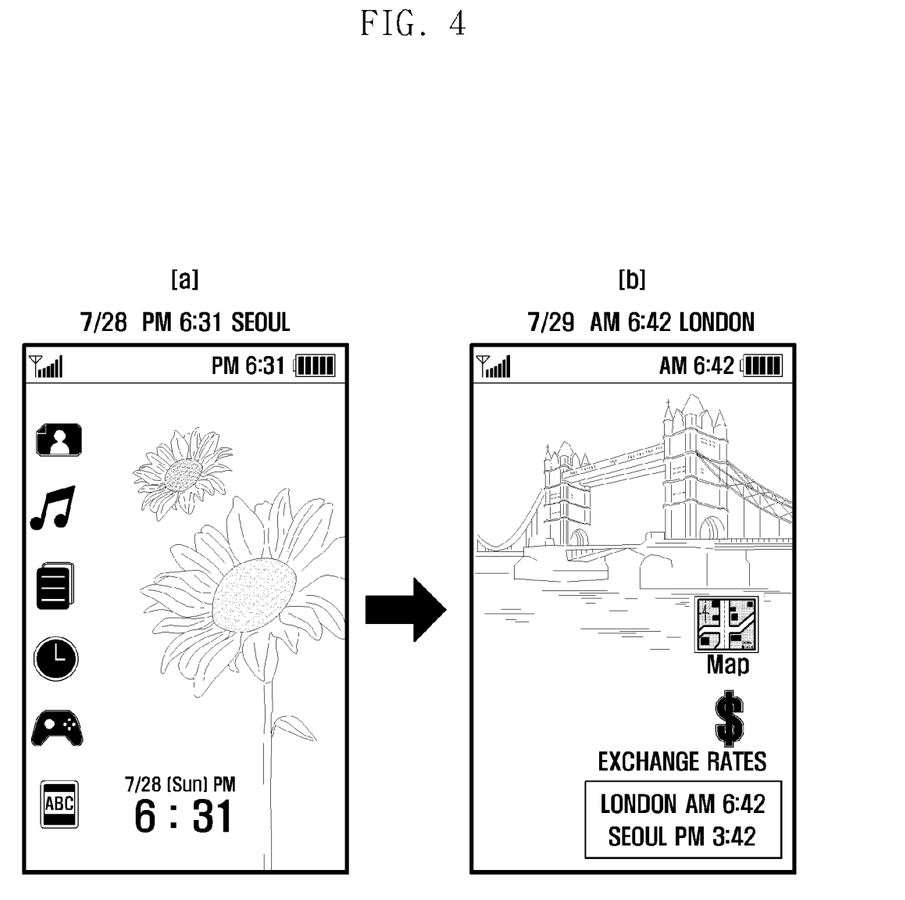
FIG. 4 is a drawing illustrating an example of a display screen displaying a GUI suitable for a current situation according to an exemplary embodiment of the present invention.

FIG. 4 illustrates an example of a display screen displaying a GUI suitable for a current situation according to an exemplary embodiment of the present invention.

In FIG. 4, 'situation information' stored in the situation information DB 162 can be comprised of 'location information' or 'moving distance information' of portable terminal.

Illustration [a] of FIG. 4 illustrates an exemplary display screen of a portable terminal when a user is positioned in 'Seoul' at 6:31 P.M., on 28th July. The user was to be on a business trip to 'London', and to arrive in 'London' at 6:42 A.M., 29th July.

The situation information collection unit 192 collects 'London' as current location information of the portable terminal, which is then sent to the situation information matching unit 194. The situation information matching unit 194 searches situation information including the location information of 'London' from the situation information DB 162, extracts function information that is matched with the situation information of 'London' and is also stored. It is assumed that 'London image display', 'map', 'exchange rate' and 'world time' function information are stored in the situation information DB 162 while being matched with the situation information of the collected location 'London'. The situation information anticipates those functions that correspond to functions that are frequently used when a portable terminal user arrives in 'London', and the function information can be stored during the manufacture of portable terminal, or can be stored by based on a user's settings. The situation information matching unit 194 sends function information including a 'London image display', a 'map', an 'exchange rate' and a 'world time' to the GUI configuration unit 196. The GUI configuration unit 196 extracts graphic objects corresponding to the function information including 'London image display', 'map', 'exchange rate' and 'world time' from the storage 160, and forms the GUI of a 'situation suitable mode' with the extracted graphic objects. The GUI of the 'situation suitable mode' according to the embodiment of the present invention can be comprised of a form that is completely different from that of the GUI of a 'normal mode' (i.e., an existing display or presentation), or can be comprised of a form that only a part of the GUI of the 'normal mode' is changed (i.e., incorporation of the graphic object into the normal mode presentation) (modified normal mode). According to the embodiment of the present invention, the controller 190 can display a message that selects whether to convert the display into the 'situation suitable mode' by controlling the display unit 180.

Figure 7A:
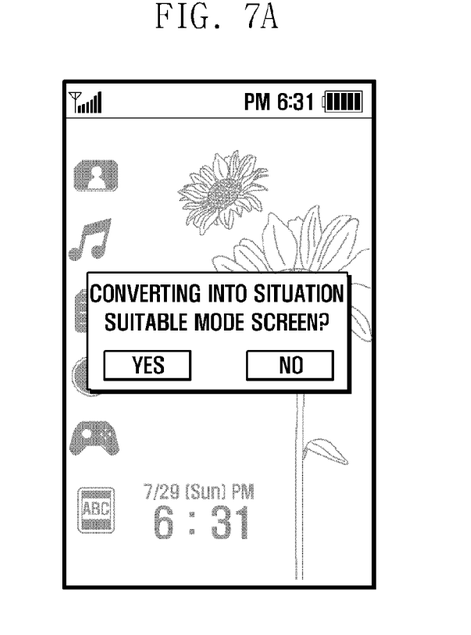
FIG. 7a is a drawing illustrating a display screen displaying a message that enables a portable terminal to convert into 'situation suitable mode' according to an exemplary embodiment of the present invention.

FIG. 7A is a drawing illustrating a display screen displaying a message that selects the conversion of the display into a 'situation suitable mode' according to an exemplary embodiment of the present invention.

Sometimes, a user intends to maintain the current display state of the portable terminal. Therefore, a user displays a message selecting whether to convert a mode and can prevent the display screen from being changed regardless of the intention of user. If a user selects to convert the display into a 'situation suitable mode' display, the controller 190 controls the display unit 180 and displays the GUI of the 'situation suitable mode' formed by the GUI configuration unit 196.

Returning to FIG. 4, illustration [b] of FIG. 4 is an exemplary display screen that displays a 'situation suitable mode'. In this case, illustration [b] of FIG. 4 displays a London image as a background image, and displays a 'map' application execution icon, a 'exchange rate' application execution icon, and a 'world time' application execution icon in accordance with the previously provided information.

Illustration [b] of FIG. 4 corresponds to the display screen of 'situation suitable mode', and is of a form that is completely different from the display screen (illustration [a] of FIG. 4) of a 'normal mode'. In this 'situation suitable mode', a user can easily execute function(s) without searching a menu of portable terminal to find a desired function. According to the embodiment of the present invention, the controller 190 can display a message that selects whether to convert the display into a 'situation suitable mode' by controlling the display unit 180 before the GUI configuration unit 196 constitutes the GUI of the 'situation suitable mode'. Moreover, the controller 190 can control the display unit 180 and display a message that selects whether to convert the display into a 'situation suitable mode' in the form of at least one graphic function executing icon.

Figure 7B:
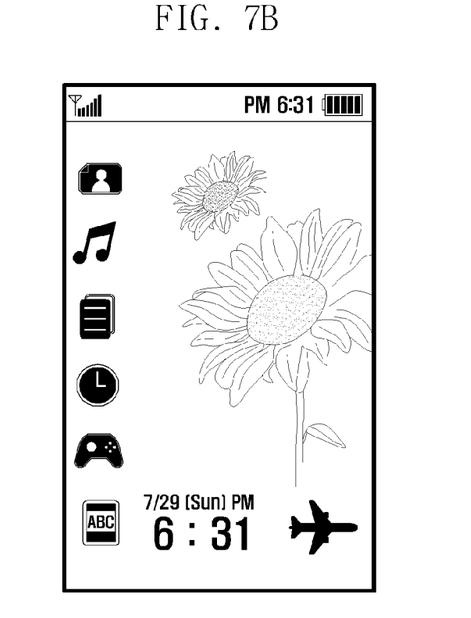
FIG. 7b is a drawing illustrating a display screen displaying a message that enables a portable terminal to convert into 'situation suitable mode' in the form of icon according to an exemplary embodiment of the present invention.

FIG. 7B is an exemplary display screen presenting a message for the selection of conversion into a 'situation suitable mode' in the form of icon according to an exemplary embodiment of the present invention.

FIG. 7B shows a 'trip' icon with an 'airplane' shape in the lower portion of a right side of a screen, and shows a display screen of a 'situation suitable mode' by controlling the display unit 180 as shown in illustration [b] of FIG. 4 when user clicks the 'trip' icon. That is, when a user clicks the illustrated 'trip' icon, the controller 190 recognizes this as a command that the user has selected the display be converted into a 'situation suitable mode' and controls the display unit 180 to present the display screen as a 'situation suitable mode'. The situation information collection unit 192 can collect 'moving distance information' when 'moving distance information' is stored in the situation information DB 162 as 'situation information'. When user rides in an airplane at 'In-cheon international airport' and moves to 'London', the situation information collection unit 192 collects 'moving distance information' based on 'In-cheon International Airport'. When 'moving distance information' is collected based on 'In-cheon International Airport, which can be performed based on a spot which is continuously positioned for a certain time, or based on a spot relating to 'airport'.

In case a range or distance (e.g., '1000 km') is stored in the situation information DB 162 as 'moving distance information', the situation information matching unit 194 determines whether the moving distance information collected by the situation information collection unit 192 corresponds to 1000 km or more. In case of 1000 km or more, function information which is stored in response to this is extracted and sent to the GUI configuration unit 196. In case the moving distance is 1000 km or more, it can be considered as off the country, and may be assumed that function information including 'map', 'exchange rate', and 'world time' is stored in the situation information DB 162 in connection with 'moving distance information 1000 km'. The situation information matching unit 194 can extract function information including 'map', 'exchange rate', and 'world time' from the situation information DB 162 and send it to the GUI configuration unit 196. The GUI configuration unit 196 can extract a graphic object corresponding to 'map', 'exchange rate', and 'world time' function from the storage 160 and constitute a GUI by extracted graphic objects.

Figure 5:
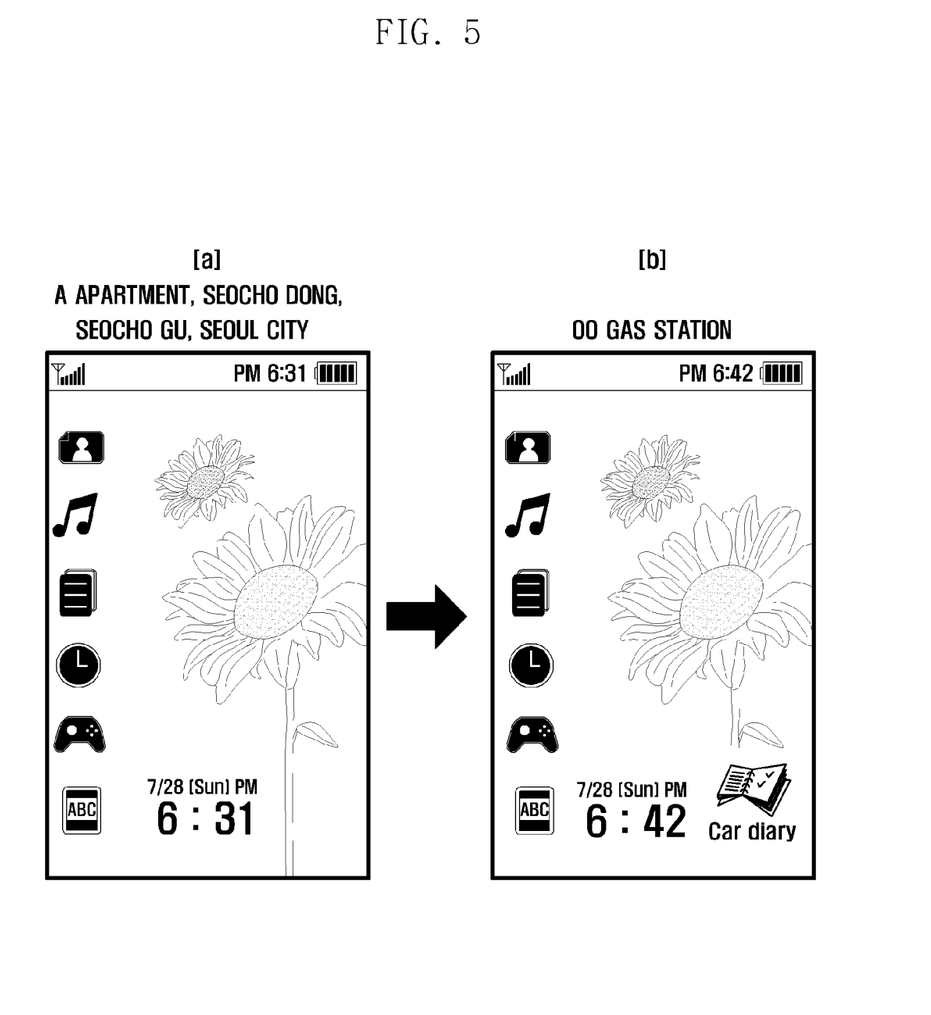
FIG. 5 is a drawing illustrating another example of a display screen displaying a GUI suitable for a current situation according to an exemplary embodiment of the present invention.

FIG. 5 is a drawing illustrating another example of display screen displaying a GUI suitable for the current situation according to an exemplary embodiment of the present invention.

In FIG. 5, the 'situation information' stored in the situation information DB 162 can include 'location information' of a portable terminal. Illustration [a] of FIG. 5 is a display screen of the portable terminal when a user is positioned in 'A apartment Seocho-Dong Seocho-Gu Seoul City'. The screen displayed in illustration [a] of FIG. 5 shows an exemplary idle screen of a normal mode. When user moves from a current location to 'OO gas station', for example, the situation information collection unit 192 collects 'OO gas station' as the current location information of the portable terminal and sends it to the situation information matching unit 194. The situation information matching unit 194 searches the situation information which is classified as the same situation as the location information of 'OO gas station' in the situation information DB 162, extracts the function information which is matched with the situation information of 'OO gas station' and stored. Assuming, for example, that a 'car diary' functions is stored in the situation information DB 162 while being matched with the situation information of 'OO gas station'. According to the embodiment of the present invention, the situation information of 'gas station' can be stored in the situation information DB 162, which can include all location information corresponding to 'gas station' such as 'OO gas station', and/or 'XX gas station'. The situation information matching unit 194 sends the extracted 'car diary' function information to the GUI configuration unit 196. And the GUI configuration unit 196 extracts a graphic object corresponding to 'car diary' function information from the storage 160, and constitutes the GUI of 'situation suitable mode' by the extracted graphic object.

Figure 6:
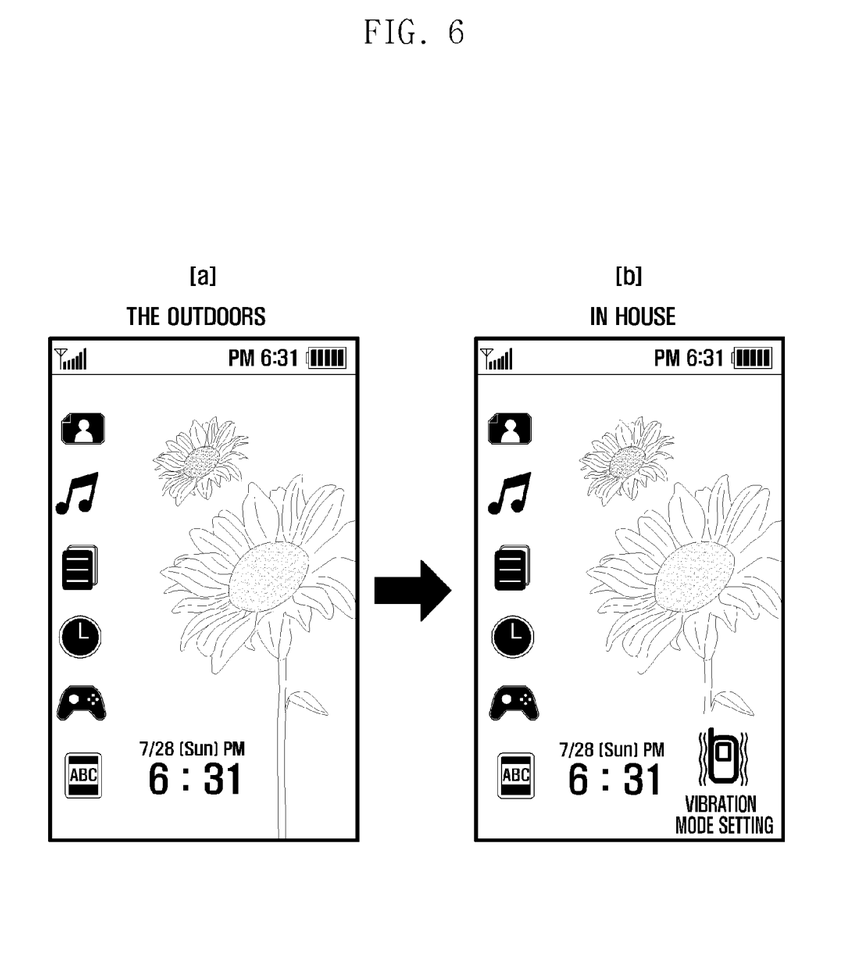
FIG. 6 is a drawing illustrating another example of a display screen displaying a GUI suitable for a current situation according to an exemplary embodiment of the present invention.

FIG. 6 is a drawing illustrating another example of a display screen displaying a GUI suitable for the current situation according to an exemplary embodiment of the present invention.

In FIG. 6, the 'situation information' stored in the situation information DB 162 includes 'peripheral device information'. The situation information collection unit 192 controls the near distance communication module unit 130 to collect 'peripheral device information'. In the present embodiment, it is assumed that the near distance communication module unit 130 is a Bluetooth module. However, it would be appreciated that other types of near distance communication protocols may be used without altering the scope of the invention.

Illustration [a] of FIG. 6 is a display screen of the portable terminal when a user is positioned in 'the outdoors'.

The screen displayed in illustration [a] of FIG. 6 presents an exemplary idle screen of a portable terminal. It is assumed that 'Bluetooth speaker' does not exist within a range in which Bluetooth communications is possible around the current location information ('the outdoors') of the portable terminal, but 'Bluetooth speaker' exists 'in house'. The situation information collection unit 192 controls a Bluetooth module and searches for devices available for a neighboring Bluetooth communications region on a real time basis or in a certain time period.

That is, the Bluetooth module broadcasts an inquiry signal in a certain cycle, and receives an inquiry response signal from a neighboring portable terminal or device, so that it can collect information of the neighboring portable terminal(s) or device(s). The situation information collection unit 192 is unable to search 'Bluetooth speaker' when the user is positioned in 'the outdoors'. When the user moves from 'the outdoors' to 'in house', the situation information collection unit 192 controls the near distance communication module unit 130 (corresponding to Bluetooth module) and searches for 'Bluetooth speaker' positioned in the vicinity of the portable terminal, and sends the search information to the situation information matching unit 194. The situation information matching unit 194 searches situation information including information of peripheral device called 'Bluetooth speaker' in the situation information DB 162, and extracts the function information that is matched with situation information of 'Bluetooth speaker', which is stored. Assuming a 'vibration mode setting' function is stored in the situation information DB 162 while being matched with the situation information of 'Bluetooth speaker'. When the Bluetooth speaker is found to exist in the vicinity of the user, the user can change the portable terminal into 'vibration mode'. Therefore, 'Bluetooth speaker' and 'vibration mode setting' are matched and stored in the situation information DB 162. The situation information matching unit 194 sends the extracted 'vibration mode setting' function information to the GUI configuration unit 196. The GUI configuration unit 196 extracts a graphic object corresponding to 'vibration mode setting' function information from the storage 160, and constitutes the GUI of 'situation suitable mode' using the extracted graphic object. The present invention provides a suitable GUI when portable terminal confronts a certain situation, so that a desired portable terminal function can be conveniently be implemented.

The above-described methods executable in the controller according to the present invention can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for providing a user interface in an electronic device, comprising:
    displaying a graphical user interface (GUI) including a plurality of first graphic objects;
    collecting, by a controller, current situation information;
    displaying a prompt requesting a user to specify whether the user wishes the electronic device to operate in one of a modified normal mode and a situation suitable mode;
    setting a configuration setting to a first value when the user chooses to operate the electronic device in the modified normal mode or setting the configuration setting to a second value when the user chooses to operate the electronic device in the situation suitable mode;
    responsive to the current situation information satisfying a criterion and the configuration setting being set to the first value, displaying a second graphic object in the GUI without replacing or removing any of the first graphic objects from the GUI; and
    responsive to the current situation information satisfying the criterion and the configuration setting being set to the second value, displaying the second graphic object in the GUI while also replacing or removing one or more of the first graphic objects from the GUI;
    wherein the configuration setting specifies at least in part whether a screen background image that is part of the GUI is to be varied according to the current situation information.

2. The method of claim 1, wherein at least one of the first graphic objects includes an icon.

3. The method of claim 1, wherein at least one of the first graphic objects is removed from the GUI when the configuration setting is set to the second value and the criterion is satisfied.

4. The method of claim 1, wherein one of the first graphic objects is replaced by the second graphic object in the GUI when the configuration setting is set to the second value and the criterion is satisfied.

5. The method of claim 1, wherein collecting the current situation information includes detecting a current location of the electronic device.

6. The method of claim 1, further comprising:
    storing, in a memory, an indication of a range relative to a given location;
    wherein collecting the current situation information includes determining a current location of the electronic device; and
    wherein the criterion is satisfied by the current situation information when the electronic device is located outside of the range.

7. The method of claim 1, wherein:
    collecting the current situation information includes determining a length of a path traveled by the electronic device; and
    the criterion is satisfied by the current situation information when the length of the path exceeds a threshold.

8. An electronic device comprising a memory, an input device, and a controller, the controller being configured to:
    display a graphical user interface (GUI) including a plurality of first graphic objects;
    collect current situation information;
    display a prompt requesting a user to specify whether the user wishes the electronic device to operate in one of a modified normal mode and a situation suitable mode;
    set a configuration setting to a first value when the user chooses to operate the electronic device in the modified normal mode or set the configuration setting to a second value when the user chooses to operate the electronic device in the situation suitable mode;
    responsive to the current situation information satisfying a criterion and the configuration setting being set to the first value, display a second graphic object in the GUI without replacing or removing any of the first graphic objects from the GUI; and responsive to the current situation information satisfying the criterion and the configuration setting being set to the second value, display the second graphic object in the GUI while also replacing or removing one or more of the first graphic objects from the GUI, wherein the configuration setting specifies at least in part whether a screen background image that is part of the GUI is to be varied according to the current situation information.

9. The electronic device of claim 8, wherein at least one of the first graphic objects includes an icon.

10. The electronic device of claim 8, wherein at least one of the first graphic objects is removed from the GUI when the configuration setting is set to the second value and the criterion is satisfied.

11. The electronic device of claim 8, wherein one of the first graphic objects is replaced by the second graphic object in the GUI when the configuration setting is set to the second value and the criterion is satisfied.

12. The electronic device of claim 8, wherein collecting the current situation information includes detecting a current location of the electronic device.

13. The electronic device of claim 8, wherein:
the controller is further configured to store, in the memory, an indication of a range relative to a given location;
collecting the current situation information includes determining a current location of the electronic device; and
the criterion is satisfied by the current situation information when the electronic device is located outside of the range.

14. The electronic device of claim 8, wherein:
collecting the current situation information includes determining a length of a path traveled by the electronic device; and
the criterion is satisfied by the current situation information when the length of the path exceeds a threshold.

* * * * *